United States Patent [19]

Kanazawa et al.

[11] Patent Number: 4,849,046

[45] Date of Patent: Jul. 18, 1989

[54] METHOD OF PRODUCING OUTER CUSHION LAYER OF SEATBACK

[75] Inventors: Yuzo Kanazawa; Tomoki Mathubara, both of Gifu, Japan

[73] Assignee: Ikeda Bussan Co., Ltd., Ayase, Japan

[21] Appl. No.: 197,576

[22] Filed: May 23, 1988

[30] Foreign Application Priority Data

May 29, 1987 [JP] Japan ............................ 62-83434[U]

[51] Int. Cl.[4] .............................................. B32B 31/18

[52] U.S. Cl. ....................................... 156/267; 5/481; 29/91.1; 112/262.1; 156/275.1; 156/292; 297/456; 297/DIG. 1

[58] Field of Search ............... 5/481; 29/91.1; 156/93, 156/204, 227, 258, 264, 266, 269, 292, 275.1, 267; 297/456, DIG. 1; 428/104; 112/262.1

[56] References Cited

U.S. PATENT DOCUMENTS 4,040,881 8/1977 Wallace ................................ 156/93

4,708,760 11/1987 Mark et al. ....................... 156/93 X

*Primary Examiner*—Robert A. Dawson

*Attorney, Agent, or Firm*—Foley & Lardner, Schwartz, Jeffery, Schwaab, Mack, Blumenthal & Evans

[57] ABSTRACT

A method of producing an outer cushion layer for a seatback is disclosed, which comprises preparing a base cushion layer material which is of a flexible layered structure, stamping out a shaped cushion material from the base cushion layer material, the shaped cushion layer material being of a train of cushion pieces which are connected to one another through integrally connecting bridge portions, bringing mutually facing edge portions of every adjacent two of the cushion pieces into contact with each other having the integrally connecting bridge portions protruded from one side of the shaped cushion material, and stitching the protruded portions and the mutually contacting edge portions of the shaped cushion layer material. With this method, an outer cushion layer having a smoothly corrugated surface is produced.

9 Claims, 3 Drawing Sheets

METHOD OF PRODUCING OUTER CUSHION LAYER OF SEATBACK

BACKGROUND OF THE INVENTION

1. Field of the Invention

The present invention relates generally to a method of producing a component of an automotive seat, and particularly to a method of producing a decorative outer cushion layer for a seatback. More specifically, the present invention is concerned with a method of producing an outer cushion layer which has a smoothly corrugated surface exposed to the outside.

2. Description of the Prior Art

Nowadays, some of the seats installed in passenger motor vehicles are of a type, which, as is shown in FIG. 5 of the accompanying drawings, provides a seatback "B" with a smoothly corrugated front surface "S" for not only giving a seat occupant a comfortable sitting posture but also improving an external appearance of the seat. The corrugated surface "S" is characterized by an outer cushion layer "CU" mounted on an inner cushion pad which is supported on a seatback frame. The outer cushion layer "CU" is provided by trimming a cushion material 20 which is shown in FIG. 8.

Hitherto, the cushion material 20 has been produced by the method as will be described in the following.

First, as is shown in FIG. 6, a plurality (viz., four in the illustrated case) of cushion pieces 10, 12, 14 and 16 of different sizes are prepared, each being of a flexible layered structure including a pad medium "b" made of a foamed material, an outer skin "a" bonded to an upper surface of the pad medium "b" and a base cloth "c" bonded to a lower surface of the pad "b". These cushion pieces are arranged in a given order by manual labor and, as is shown in FIG. 7, jointed to one another by stitching mutually facing edges of adjacent two thereof with a thread 18. With these steps, a cushion layer material 20 (viz., the cushion layer material with a corrugated outer surface) having three parallel channels "C" is produced. That is, parallel semicylindrical portions are formed on the cushion layer material 20. This cushion layer material 20 is then trimmed to a desired shape for its mounting to the inner cushion pad on the seatback frame.

However, the method as described hereinabove has the following inherent drawbacks.

Since the cushion pieces 10, 12, 14 and 16 are left separated before their jointing, placing them in the given order by manual labour is difficult or at least troublesome. Furthermore, selection of a proper piece from a cluster of the cushion pieces of different sizes is troublesome. This may sometimes induce misplacement of the cushion pieces, which would cause production of an inferior cushion material.

SUMMARY OF THE INVENTION

It is therefore an object of the present invention to provide a method of producing a decorative outer cushion layer, which is free of the above-mentioned drawbacks.

According to the present invention, there is provided a method of producing a cushion of a seat. The method comprises the steps of producing a base cushion material which is of a flexible layered structure; stamping out a shaped cushion material from the base cushion material, the shaped cushion material being of a train of cushion pieces which are connected to one another through integrally connecting portions; applying mutually facing edge portions of adjacent two of the cushion pieces with an adhesive; bringing the facing portions into contact with each other having the integrally connecting portions protruded from a back side of the shaped cushion material; and fixing the protruded portion of each integrally connecting portion in a manner to assure adhesion between the mutually facing edge portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the method of the present invention will be described with reference to FIGS. 1 to 4 of the accompanying drawings.

Figure 3:
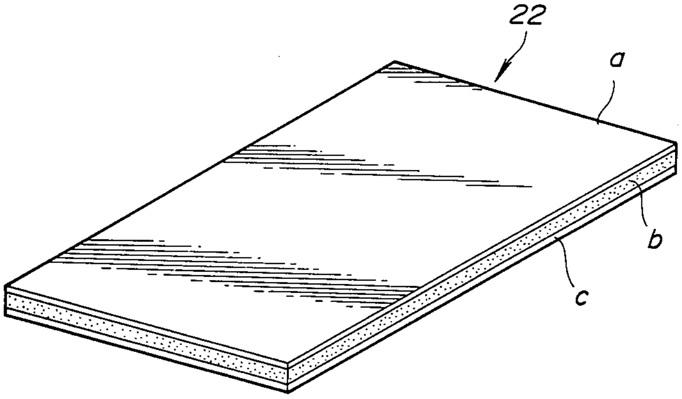
FIG. 3 is a perspective view of an original cushion material from which the cushion layer material of FIG. 1 is stamped out.

First, a base cushion layer material 22 as shown in FIG. 3 is prepared, which is of a flexible layered structure including a pad medium "b", an outer skin "a" bonded to an upper surface of the pad medium "b" and a base sheet "c" bonded to a lower surface of the pad medium "b". The pad medium "b" is made of a foamed material, such as polyurethane foam, polyethylene foam or the like, and the outer skin "a" is made of natural leather, synthetic leather, cloth or the like, and the base sheet "c" is made of a thin cloth.

Figure 1:
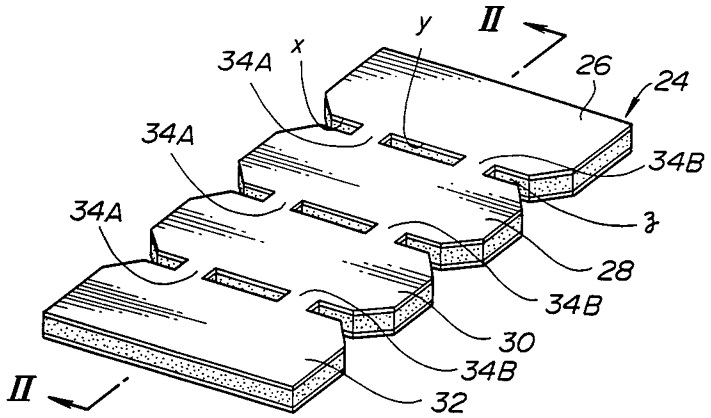
FIG. 1 is a perspective view of an incomplete cushion layer material which is produced during the steps of the method according to the present invention.
Figure 2:
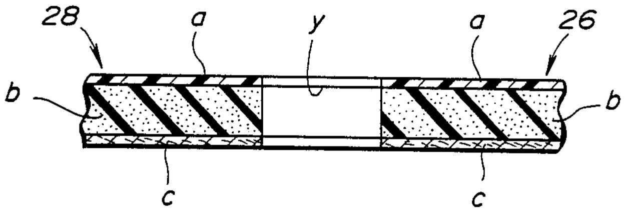
FIG. 2 is a partial and enlarged section view taken along the line II—II of FIG. 1.

Then, the base cushion layer material 22 is stamped to produce such a cushion layer material 24 as that shown in FIG. 1, which is a train of four cushion pieces 26, 28, 30 and 32 of different sizes and shapes which are connected to one another through integrally connecting bridge portions 34A and 34B. That is, between adjacent two cushion pieces, there are defined three aligned clearances "x", "y" and "z" which are bounded by the connecting bridge portions 34A and 34B, as is seen from FIG. 1. The construction of the cushion material 24 will be well understood from FIG. 2 which shows a partial section of cushion material 24 taken along the line II—II of FIG. 1.

Figure 4:
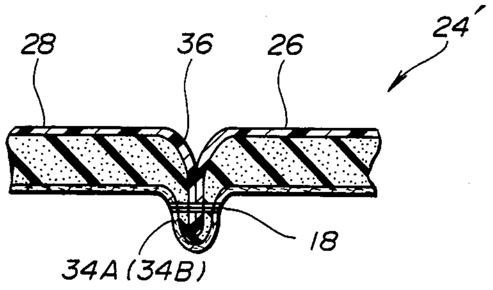
FIG. 4 is a sectional view of a stitched portion which is possessed by a completed cushion layer material.
Figure 8:
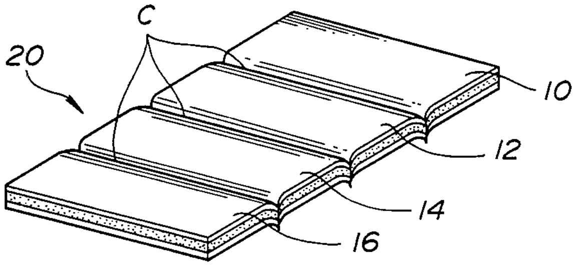
FIG.8 (Prior Art)
FIG. 8 is a perspective view of an incomplete cushion layer material produced by the conventional method.

Then, as will be seen from FIG. 4, mutually facing edge portions of the adjacent cushion pieces (viz., the pieces 26 and 28, the pieces 28 and 30, and the pieces 30 and 32) are applied with a suitable adhesive and brought into contact with each other such that the integrally connecting bridge portions 34A and 34B protrude toward the back side of the cushion layer material 24. The protruded portion of each connecting portion 34A or 34B is then stitched with a thread 18, so that the adhesion between the mutually facing portions is assured. If desired, the stitching of the protruded portions may be made without using the adhesive. In this case, the mutually facing portions of the adjacent cushion pieces are also stitched. With these steps, parallel channels 36 are formed on the front surface of the cushion layer material 24' at the portions where the mutually facing edges of the adjacent cushion pieces are bonded. That is, parallel semicylindrical portions are formed on the front surface. If desired, the protruded portion may be bonded with an adhesive without using the thread 18. For this bonding, a so-called "high frequency adhesion technique" may be used. With these steps, a cushion layer material 24' like the conventional layer material 20 shown in FIG. 8 is produced.

Figure 5:
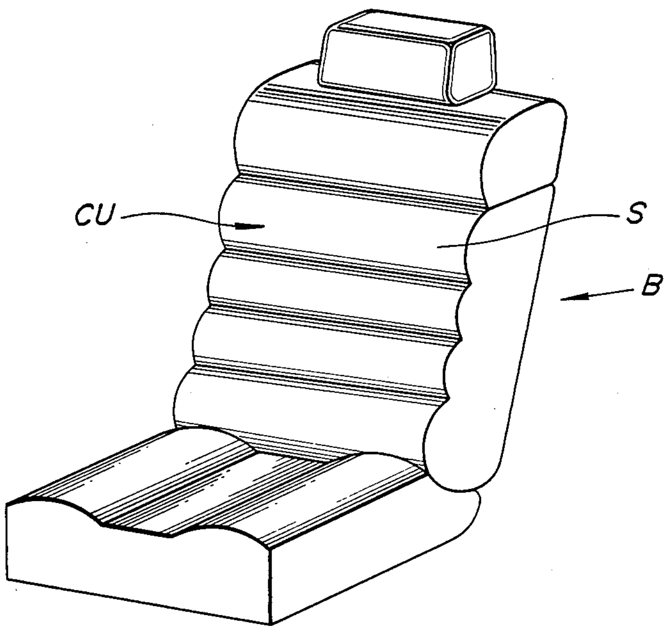
FIG. 5 is a perspective view of an automotive seat having a seatback outer cushion layer the front surface of which is smoothly corrugated.
Figure 6:
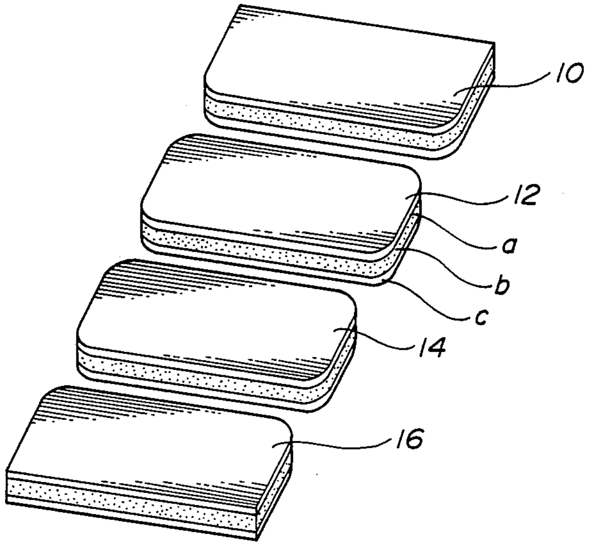
FIG.6 (Prior Art)
FIG. 6 is a perspective view of cushion pieces which are produced during the steps of a conventional method.
Figure 7:
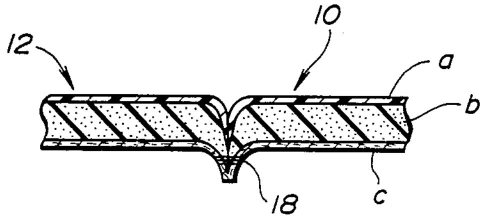
FIG.7 (Prior Art)
FIG. 7 is a sectional view of a stitched portion which is possessed by the outer cushion layer produced by the conventional method.

The cushion layer material is then trimmed to have a desired shape and then properly mounted to an inner cushion pad on a seatback frame having its corrugated front surface exposed to the outside, as will be understood from FIG. 5.

Advantages of the present invention will be described in the following.

First, since the cushion pieces 26, 28, 30 and 32 are integrally connected like a train, there is no need of orderly placing these pieces by often awkward manual labor. Furthermore, for the same reason, there is no need of making a selection of each cushion piece. These advantages remove or at least minimize inferior productions of the seat and thus improve the productive efficiency of the same.

What is claimed is:

1. A method of producing an outer cushion layer of a seat, comprising by steps:

(a) producing a base cushion layer material which is of a flexible layered structure;

(b) stamping out a shaped cushion layer material from said base cushion layer material, said shaped cushion layer material being of a train of cushion pieces which are connected to one another through integrally connecting bridge portions;

(c) bringing mutually facing edge portions of every adjacent two of said cushion pieces into contact each other having the integrally connecting bridge portions protruded from one side of the shaped cushion layer material; and (d) fixing the protruded portions and the mutually contacting edge portions of the shaped cushion layer material.

2. A method as claimed in claim 1, in which said step (d) is achieved by stitching said protruded portions and said mutually contacting edge portions with threads.

3. A method as claimed in claim 1, in which said step (d) is achieved by using an adhesive.

4. A method as claimed in claim 1, in which said step (d) is achieved by using a high frequency adhesion technique.

5. A method as claimed in claim 1, in which said flexible layered structure of said base cushion layer material comprises a pad medium, an outer skin bonded to an upper surface of said pad medium and a base sheet bonded to a lower surface of said pad medium.

6. A method as claimed in claim 5, in which said pad medium is made of a foamed plastic.

7. A method as claimed in claim 6, in which said cushion pieces are different in size and shape.

8. A method as claimed in claim 7, in which every adjacent two of said cushion pieces define therebetween aligned three clearances which are bounded by said integrally connecting bridge portions.

9. A method as claimed in claim 1, further comprising after the step (d), (e) trimming the product so that the same has a desired shape to be neatly applied to a seatback frame or a seat cushion frame of the seat.

* * * * *